United States Patent
Dock

[11] 3,884,090
[45] May 20, 1975

[54] ROLLER SCREW MECHANISM
[75] Inventor: Lars Ingmar Dock, Lutry, Switzerland
[73] Assignee: SKF Industrial Trading and Development Company B.V., Jutphaas, Netherlands
[22] Filed: Apr. 19, 1973
[21] Appl. No.: 352,737

[52] U.S. Cl............................ 74/424.8 C; 74/441
[51] Int. Cl......................... F16h 1/18; F16h 55/18
[58] Field of Search........................ 74/424.8 C, 441

[56] References Cited
UNITED STATES PATENTS
2,683,379  7/1954  Stranogren................... 74/424.8 C
3,726,151  4/1973  Lemor........................... 74/424.8 C FOREIGN PATENTS OR APPLICATIONS
387,391    2/1963  Switzerland................... 74/424.8 C
1,026,482  4/1966  Switzerland................... 74/424.8 C
1,243,434  8/1971  United Kingdom............ 74/424.8 C Primary Examiner—Leonard H. Gerin
Attorney, Agent, or Firm—Howson and Howson

[57] ABSTRACT

Roller screw mechanism comprising a screw member having an external thread, a nut circumscribing the screw member having an internal thread, a plurality of rollers in the annular space between said members having a groove configuration adapted to interengage with threads on the nut and screw members, and a cage for guiding said rollers, said nut comprising at least one pair of members having means adjacent their confronting axial ends defining circumferentially extending pocket and said cage consisting of an annular portion centrated in said pocket and a plurality of circumferentially spaced fingers projecting from said central annular portion axially in each direction to define a plurality of apertures on either side of the central annular portion for the rollers, each of said rollers having a web portion and said central annular portion being provided with circumferentially spaced recesses at least partly enclosing the web portion of said rollers.

5 Claims, 6 Drawing Figures

ROLLER SCREW MECHANISM

The present invention relates to a roller screw mechanism of the type comprising a nut and a screw and a number of rollers arranged therebetween so-called satellite rollers. The screw and the nut are threaded externally and internally, respectively whereas the rollers are provided with grooves at the same distance from each other and perpendicular to the roller axis. The rollers serve as transmission elements between screw and nut and decrease to a high degree the friction work in the mechanism. The rollers are in known roller screw mechanisms of this type placed and guided in a cage consisting of two annular end portions united together with longitudinal ribs. The rollers are placed in the apertures between the ribs.

The purpose of the invention is to obtain a device which makes it possible to adjust roller screw mechanisms of this type so that they will be free from play. Furthermore, that advantage is obtained that the cage and the cam elements of the mechanism will from constructional point of view be stronger and cheaper in manufacturing. One further and important advantage is that it will be practically possible to give the above mentioned cam elements a better transmission characteristic by arranging a guide surface in the form of a double parabola whereby a constant acceleration and retardation, respectively is obtained during contact between cam guide surface and roller end. Even if the roller end of this construction must be of double curved or semi-globular shape a good contact between roller end and cam guide surface is maintained during the whole re-circulation dependent on the fact that the cam element fills up the whole space between nut and screw.

These and other objects of the present invention and the various features and details of the operation and construction thereof are hereinafter more fully set forth with reference to the accompanying drawings wherein.

Figure 1:
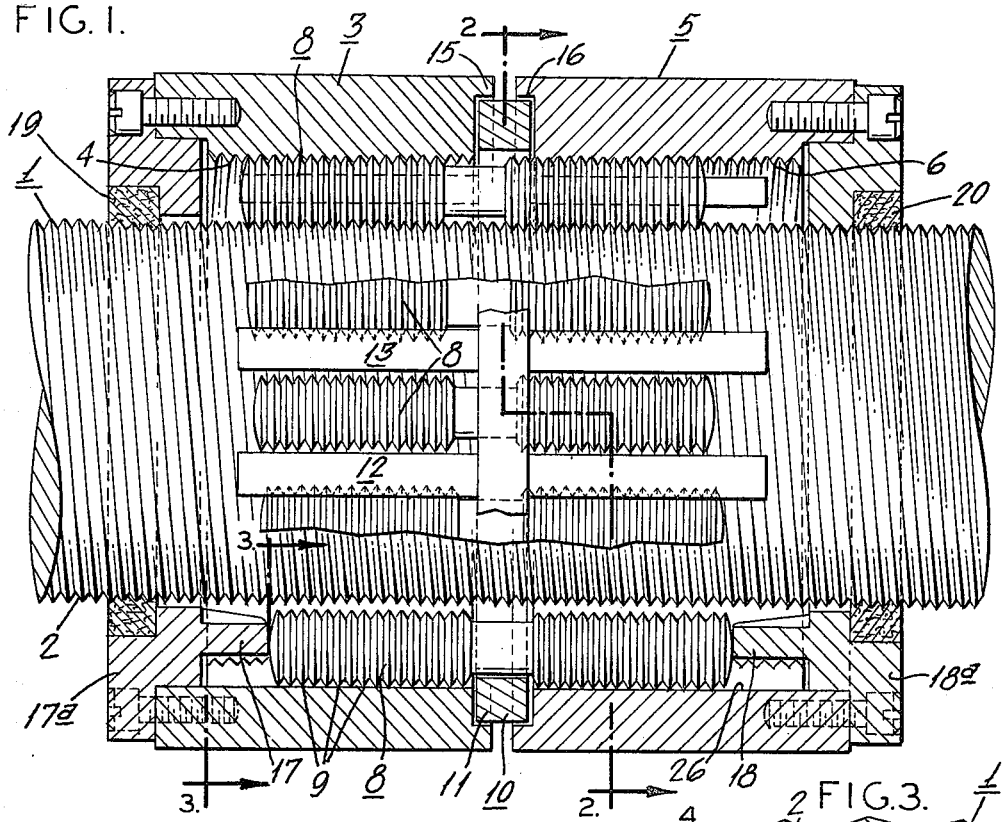
FIG. 1 is a longitudinal sectional view of a roller screw mechanism in accordance with the present invention.
Figure 2:
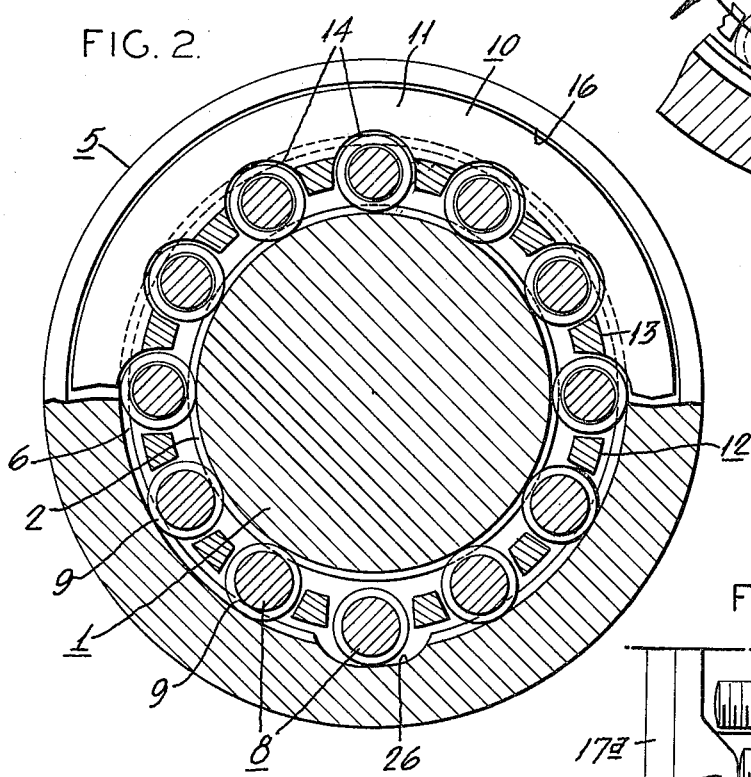
FIG. 2 is a transverse sectional view as viewed on line 2—2 of FIG. 1.
Figure 3:
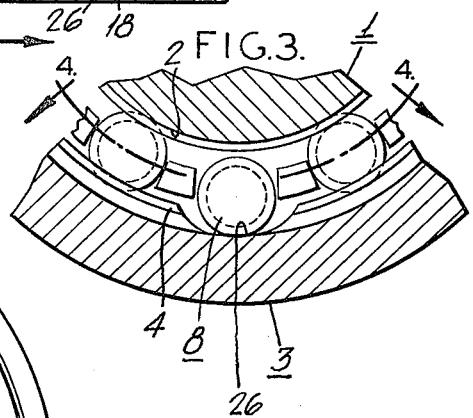
FIG. 3 is a fragmentary transverse sectional view as viewed on line 3—3 of FIG. 1.
Figure 4:
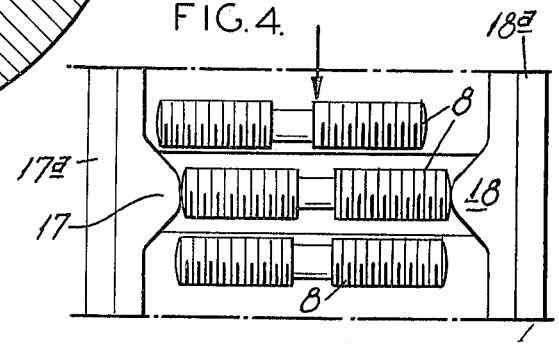
FIG. 4 is a schematic view as viewed on line 4—4 of FIG. 3.
Figure 5:
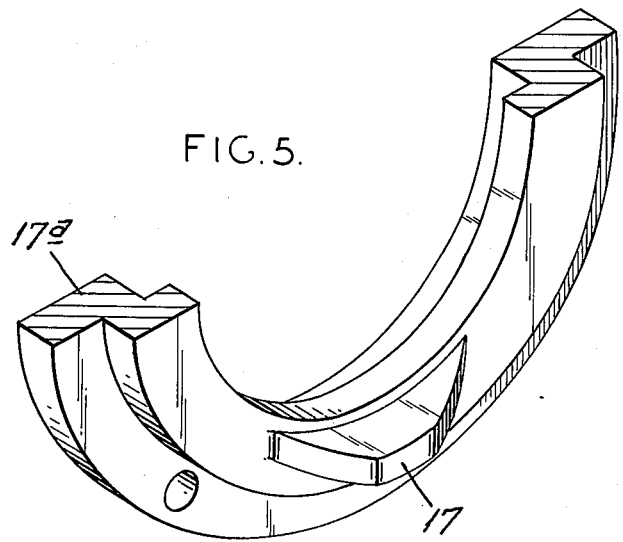
FIG. 5 is a fragmentary respective view of one of the end plates of the roller screw mechanism.

The screw 1 is provided with a thread 2. The nut which cooperates with the screw consists of two identical halves 3 and 5 each of them provided with threads 4 and 6, the diameters of which are as much greater than the diameter of the thread 2, so that an annular space is obtained between the screw and the nut. In this space a number of satellite rollers 8 are operating each of them provided with grooves 9 earlier described. The rollers are guided in a cage 10 consisting of an annular, centrally located portion 11 and therefrom axially extending fingers 12 and 13. The rollers are placed in the apertures between the fingers, and in order to allow free running for the rollers in the central portion, the same is provided with recesses 14 (Vide Figure 2). The central portion 11 of the cage 10 is centrated between the nut halves 3 in recesses 15 and 16 arranged in the halves. The rollers have such a play in the cage that they can move a distance corresponding to at least the pitch of thread in axial direction and a distance radially corresponding to at least the thread depth of the screw.

When the nut is rotated relative to the screw the rollers will move around the screw and it is necessary in course of each turn to return the rollers a distance corresponding to the pitch of thread. In the inner surface of the nut there is an axial groove 26. Each time the roller reaches this groove 26 it interrupts its contact with the thread of the screw by the aid of the annular cam elements 17 and 18 located in the nut halves at their end portions. In the present instance the cam elements 17 and 18 are formed integrally with end plates 17a and 18a respectively suitably secured to the nut halves 3 and 5 adjacent their axial ends. In this way the rollers are returned. In order to make it possible to interrupt the contact between the grooves 26 and the rollers and the thread of the screw for allowing the entrance of the rollers into the groove 26 of the nut, the cage is provided with the above mentioned recesses 14 in FIG. 2.

In order to protect the interior of the mechanism against external dirt particles seals 19 and 20 are arranged in the cam elements. In order to make it possible to adjust the roller screw mechanism so that it will be free from play or be pre-loaded the nut halves 3,5 might be provided with external flange members and by means of screws it will be possible to tighten the halves so that the desired result is obtained. The adjusting device might be designed in different ways, but the easiest way might be to tighten the nut halves against each other in a housing.

Figure 6:
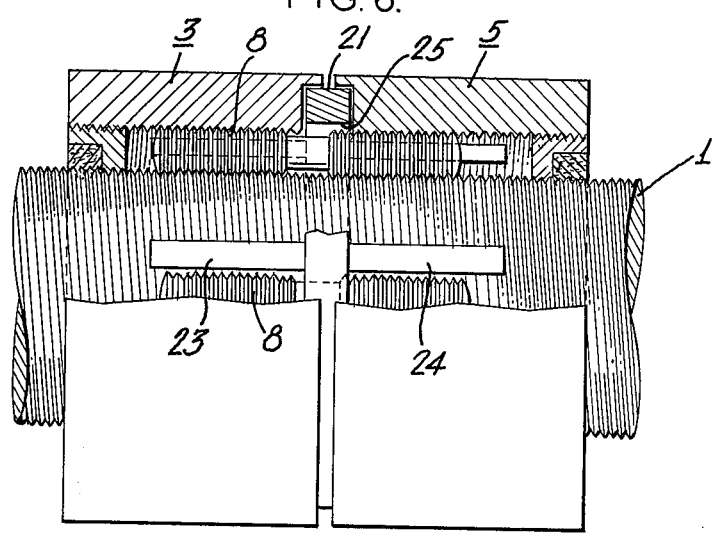
FIG. 6 is a longitudinal sectional view of a modified form of the roller screw mechanism in accordance with the present invention.

In FIG. 6, a variation of the roller screw mechanism in accordance with the invention is shown, in which a modified cage for guiding the rollers is used. This cage is designed for roller screw mechanisms in which the cage 21 can be exposed to greater load. The cage in accordance with this embodiment is fundamentally of the same design as the one described earlier but is shaped with a central portion showing a larger section area than the earlier one. It is otherwise provided with axially in each direction extending fingers 23 and 24, and the rollers 8 are placed in the apertures between the fingers. Since the central portion reaches the rollers in the interior of the mechanism, the same are provided with recesses 25 and the web portions shaped therein surrounded by the central portion 21 of the cage with a play great enough to allow the rollers to function as above described.

I claim:

1. Roller screw mechanism comprising a screw member having an external thread, a nut circumscribing the screw member having an internal thread, a plurality of rollers in the annular space between said members having a groove configuration adapted to interengage with threads on the nut and screw members, and a cage for guiding said rollers, said nut comprising at least one pair of members having means adjacent their confronting axial ends defining a circumferentially extending pocket and said cage consisting of an annular portion centrated in said pocket and a plurality of circumferentially spaced fingers projecting from said central annular portion axially in each direction to define a plurality of aperatures on either side of the central annular portion for the rollers, each of said rollers having a web portion and said central annular portion being provided with circumferentially spaced recesses at least partly enclosing the web portion of said rollers.

2. Roller screw mechanism as claimed in claim 1 wherein the diameter of the web portion is less than the largest diameter of the roller.

3. Roller screw mechanism as claimed in claim 2 wherein the clearance between said recesses and said web portion of the rollers permits displacement of said rollers in a radial direction, a distance corresponding to at least the thread depth of said screw member.

4. Roller screw mechanism as claimed in claim 2 wherein the clearance between the cage and roller permits axial movement of said rollers a distance corresponding to at least the pitch of the screw thread.

5. Roller screw mechanism as claimed in claim 1 wherein said pocket is disposed radially outwardly of said annular space and the fingers are disposed approximately centrally of the annular space and are formed integrally with the inner extremeties of the central portion of said cage on opposite sides of said recesses.

* * * * *